(12) United States Patent
Bhatt

(10) Patent No.: US 8,370,226 B1
(45) Date of Patent: Feb. 5, 2013

(54) TECHNIQUE FOR CORRECTING ROUND-OFF ERRORS

(75) Inventor: Patanjali Bhatt, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 312 days.

(21) Appl. No.: 12/762,681

(22) Filed: Apr. 19, 2010

(51) Int. Cl.
*G07B 17/00* (2006.01)
*G07F 19/00* (2006.01)

(52) U.S. Cl. .................. 705/30; 706/932; 708/551
(58) Field of Classification Search .......... 705/28, 705/30; 708/551; 706/932
See application file for complete search history.

(56) References Cited

U.S. PATENT DOCUMENTS

| | | | | |
|---|---|---|---|---|
| 6,401,107 | B1 * | 6/2002 | Yang et al. | 708/551 |
| 6,493,738 | B1 * | 12/2002 | Yoshimi | 708/551 |
| 6,978,289 | B1 * | 12/2005 | Matula | 708/551 |
| 8,037,115 | B1 * | 10/2011 | Scalora et al. | 708/204 |
| 2009/0172065 | A1 * | 7/2009 | Cornea-Hasegan | 708/497 |

FOREIGN PATENT DOCUMENTS

JP     04281524 A  * 10/1992

OTHER PUBLICATIONS

May not sum to total due to rounding the probability of rounding errors. Bottomley, Henry. Jun. 3, 2008. URL: http://binternet.com/~se16/hgb/rounding.pdf (Retrieved by Google on Sep. 28, 2012).*
Addition using Estimation. AAAMATH. URL: http:///www.aaastudy.com/g38a_ax1/htm. Feb. 26, 2008. (Retrieved by way back machine on Sep. 28, 2012).*

* cited by examiner

*Primary Examiner* — Scott Zare
(74) *Attorney, Agent, or Firm* — Park, Vaughan, Fleming & Dowler LLP; Steven E. Stupp

(57) ABSTRACT

A technique for performing a financial calculation is described. In this calculation technique, initial financial values are rounded based on a rounding criterion, and a total financial value is calculated by summing the rounded financial values. Based on the rounded financial values, associated rounding error values are computed. These rounding error values are then summed to determine a total error value. Moreover, the total error value is rounded based on the rounding criterion, and the resulting rounded total error value is used to correct a rounding error in the total financial value.

22 Claims, 6 Drawing Sheets

TECHNIQUE FOR CORRECTING ROUND-OFF ERRORS

BACKGROUND

The present disclosure relates to techniques for correcting round-off errors which arise during financial calculations.

Financial calculations are performed in a wide variety of applications, such as when calculating numbers to enter into financial statements or income-tax returns. The values computed in financial calculations are typically rounded off, for example, to the nearest dollar.

However, using rounded values financial calculations can cause problems. For example, after rounding, a resulting financial value of a financial calculation typically has a rounding error. Moreover, when the rounded values are aggregated, the total rounding error can increase. Therefore, rounding values in financial calculations can degrade the quantitative accuracy of the financial calculation (which can undermine confidence in the results of the financial calculation). Indeed, some financial professionals address this problem by adding footnotes to reports that include the results of financial calculations, which indicate that the financial calculations may not fully add up because of round-off errors. Alternatively, many financial professionals correct the total rounding error at the end of a financial calculation, but this can be time-consuming and can introduce additional errors.

SUMMARY

The disclosed embodiments relate to a computer system that performs a financial calculation. During operation, the computer system computes rounded financial values and associated rounding error values by rounding initial financial values based on a rounding criterion. Then, the computer system calculates a total financial value by summing the rounded financial values, and also calculates a total error value by summing the rounding error values. Moreover, the computer system determines a rounded total error value by rounding the total error value based on the rounding criterion. Next, the computer system generates a corrected total financial value by correcting a rounding error in the total financial value using the rounded total error value.

In some embodiments, the computer system receives the initial financial values from a user and/or accesses the initial financial values from a computer-readable medium.

Note that the financial calculation may be performed by: a spreadsheet application and/or financial software. Furthermore, the financial calculation may be associated with: an income-tax return, a financial statement, a brokerage statement, and/or an accounting statement.

In some embodiments, the rounding error is corrected by subtracting the rounded total error value from the total financial value. Moreover, the rounding criterion may be associated with a type of currency.

In some embodiments, the computer system segregates the initial financial values into groups of financial values based on types of currency that are associated with the initial financial values, where a given group of financial values is associated with a given type of currency. Then, the computer system performs the operations in the method for each group of financial values. Next, the computer system aggregates the corrected total financial values for the groups of financial values.

Another embodiment provides a method that includes at least some of the operations performed by the computer system.

Another embodiment provides a computer-program product for use with the computer system. This computer-program product includes instructions for at least some of the operations performed by the computer system.

Figure 1A:
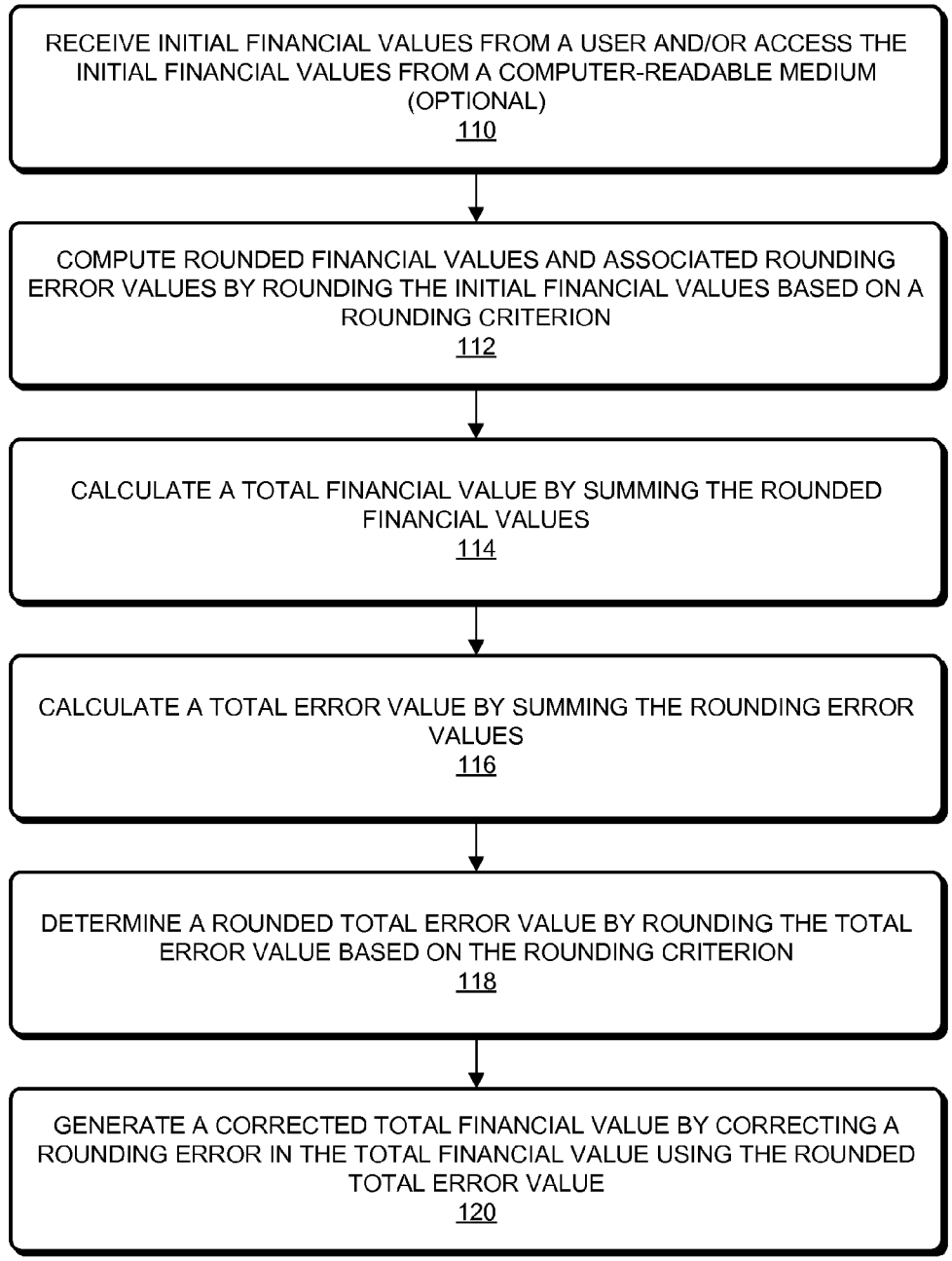
FIG. 1A is a flow chart illustrating a method for performing a financial calculation in accordance with an embodiment of the present disclosure.

Table 1 provides an example of correcting a rounding error using a rounded total error value in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for performing a financial calculation, and a computer-program product (e.g., software) for use with the computer system are described. In this calculation technique, initial financial values are rounded based on a rounding criterion, and a total financial value is calculated by summing the rounded financial values. Based on the rounded financial values, associated rounding error values are computed. These rounding error values are then summed to determine a total error value. Moreover, the total error value is rounded based on the rounding criterion, and the resulting rounded total error value is used to correct a rounding error in the total financial value.

By correcting for the rounding error, the calculation technique may solve the problem of the reduced quantitative accuracy in rounded financial calculations, thereby restoring customer and/or investor confidence. Furthermore, the calculation technique may obviate the need for footnotes that explain round-off errors, as well as time-consuming and error-prone attempts to correct for total rounding errors at the end of financial calculations.

In the discussion that follows, financial calculations are used as an illustrative example of the use of the calculation technique. However, the calculation technique may be used with a wide variety of calculations, including calculations other than financial calculations (for example, mathematical calculations, engineering calculations and/or architectural calculations).

We now describe embodiments of the method. FIG. 1A presents a flow chart illustrating a method 100 for performing a financial calculation, which may be performed by a computer or a computer system (such as computer system 300 in FIG. 3 and/or computer system 400 in FIG. 4). During operation, the computer system computes rounded financial values and associated rounding error values by rounding initial financial values based on a rounding criterion (operation 112). Then, the computer system calculates a total financial value by summing the rounded financial values (operation 114), and calculates a total error value by summing the rounding error values (operation 116). Moreover, the computer system determines a rounded total error value by rounding the total error value based on the rounding criterion (operation 118). Next, the computer system generates a corrected total financial value by correcting a rounding error in the total financial value using the rounded total error value (operation 120).

In some embodiments, the computer system optionally receives the initial financial values from a user and/or optionally accesses the initial financial values from a computer-readable medium (operation 110).

Note that the financial calculation may be performed by: a spreadsheet application (such as one that includes multiple cells arranged in rows and columns to simulate an accounting worksheet) and/or financial software. Furthermore, the financial calculation may be associated with: an income-tax return, a financial statement, a brokerage statement, and/or an accounting statement.

In some embodiments, the rounding error is corrected by subtracting the rounded total error value from the total financial value. However, in other embodiments the subtraction may be implicit, or is replaced by an addition operation. For example, the rounded total error value associated with a total revenue calculation may be added to a total business cost, and the total business costs may be subsequently subtracted from the total revenue when profit or loss for a company or an entity is determined.

Moreover, the rounding criterion may be associated with a type of currency. For example, United States dollars may be rounded to the nearest dollar, while other types of currency (which have different valuations) may be rounded to the nearest: ten dollars, hundred dollars, thousand dollars, etc.

In some embodiments, the computer system segregates the initial financial values into groups of financial values based on types of currency that are associated with the initial financial values, where a given group of financial values is associated with a given type of currency. For example, a multinational company may segregate business transactions that were conducted in different countries according to the local currencies in these countries. Then, the computer system may perform the operations in the method for each group of financial values (and in the process may correct for the rounding errors in the financial calculations for the different types of currency using the associated rounded total error values). Next, the computer system may aggregate the corrected total financial values for the groups of financial values.

In this way, method 100 may be applied to sub-financial calculations that are subsequently combined in a larger hierarchical financial calculation. This may include a series of sub-financial calculations that are all performed using the same type of currency. Thus, method 100 may be applied separately in different cascading financial calculations, such as in financial statements (for example, in cashflow, revenue, and/or asset and depreciation statements) or in income-tax returns. However, in other embodiments, method 100 may be applied concurrently in different cascading financial calculations, in which subtotals carry over from one financial calculation to another. For example, the total error value may be determined for a series of sub-financial calculations (such as different forms in an income-tax return), and the rounding error may be corrected at the end of the series of sub-financial calculations.

In some embodiments of method 100 there are additional or fewer operations. Moreover, the order of the operations may be changed and/or two or more operations may be combined into a single operation. For example, in addition to or separate from the different rounding criteria associated with the different types of currency, there may be different rounding criteria associated with different financial calculations or sub-financial calculations. Thus, there may be different rounding criteria for cashflow, revenue, and/or asset and depreciation statements. Note that the calculation technique may be applied to financial calculations in which values are rounded down (a 'floor' operation), rounded up (a 'ceiling' operation) and/or are rounded to a particular digits (such as the nearest ten dollars or the 'tens' digit).

In an exemplary embodiment, the calculation technique is applied recursively as a series of computations are performed (for example, line by line in a set of statements or supporting schedules). In the process, the rounding error is tracked, and the end result of the financial calculation is corrected for the rounding error.

Table 1 provides an example of correcting a rounding error using a rounded total error value. In this example, three financial values (which are each $1.51) are each rounded to the nearest dollar (i.e., $2). These rounded financial values are summed to determine the total financial value of $6. Note that if the three financial values were summed before rounding, then the total financial value would be $5 instead of $6. Thus, there is a $1 rounding error in the total financial value.

TABLE 1

|  | Financial value ($) | Rounded financial values ($) | Rounding error values ($) |
| --- | --- | --- | --- |
|  | 1.51 | 2 | 0.49 |
|  | 1.51 | 2 | 0.49 |
|  | 1.51 | 2 | 0.49 |
| Total financial value | — | 6 | — |
| Total error value | — | — | 1.47 |
| Rounded total error value | — | — | 1 |
| Corrected total financial value | — | 5 | — |

Using method 100 (FIG. 1A), the rounding error values associated with the rounded financial values (which are each $0.49) are computed. Then, the total error value ($1.47) is calculated. When rounded to the nearest dollar, the corresponding rounded total error value is $1. Subtracting the rounded total error value from the total financial value results in the corrected total financial value of $5.

Figure 1B:
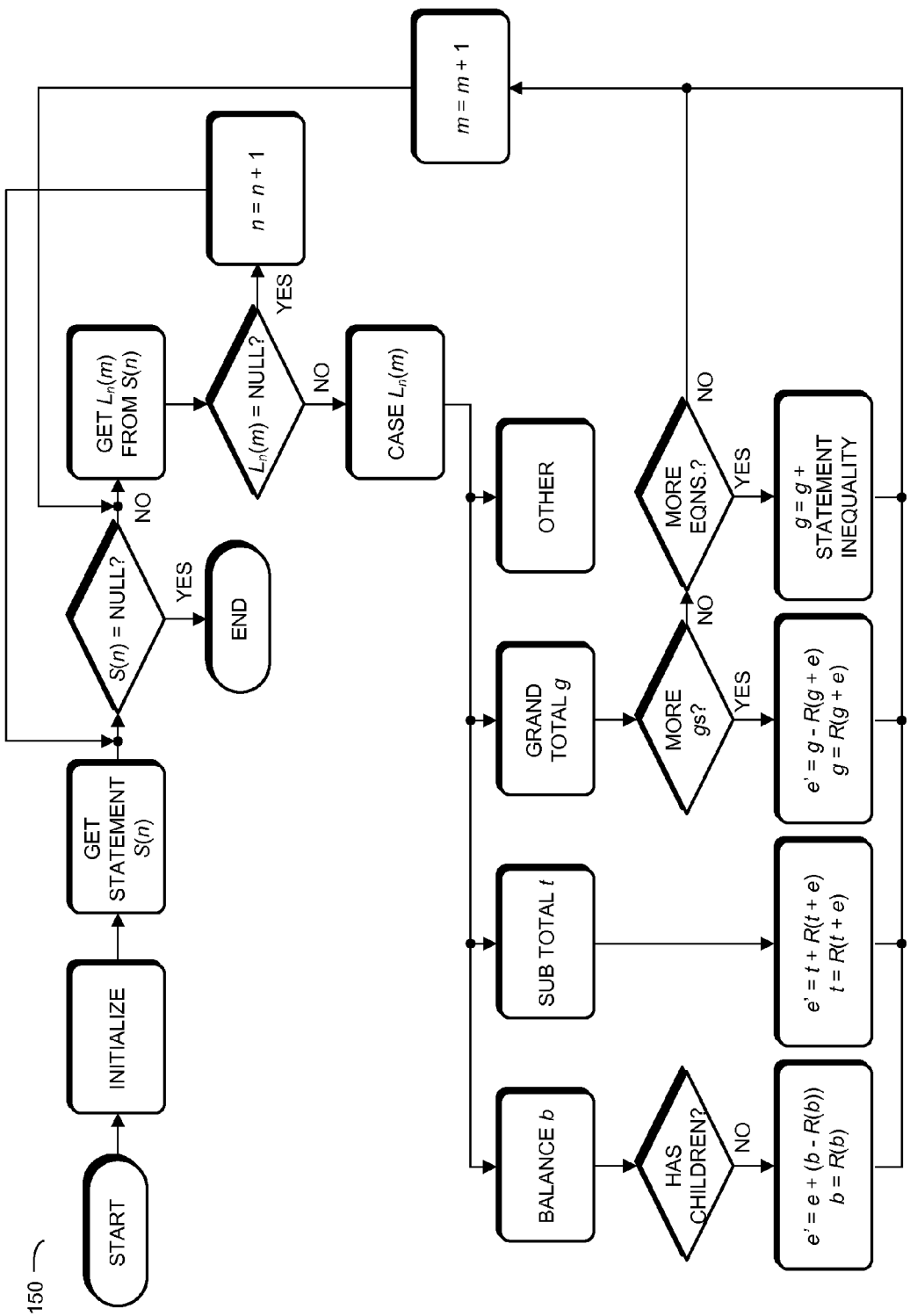
FIG. 1B is a flow chart illustrating a method for performing a financial calculation in accordance with an embodiment of the present disclosure.

Another exemplary embodiment is shown in FIG. 1B, which presents a flow chart illustrating a method 150 for performing a financial calculation. During an initialization operation, the row (n) and column (m) for entries in a financial statement or calculation (S) are set to zero, and the current error (e) is set to 'NULL.' Then, the first row in the financial statement (S(n)) is accessed. If it is empty or 'NULL,' then method 150 ends. Otherwise, the entries in the columns in this first row are sequentially processed. In particular, during the processing of a given entry ($L_n(m)$) in the first row, a determination is made as to whether the given entry is a balance (b), a sub total (t), a grand total (g), or other. If the given entry in the first row is a balance (b), and it has no children or dependent entries, the revised error (e') is the current error (e) plus the difference between the balance (b) and the rounded value of the balance (R(b)) (rounded up or down, or to a particular digit), and the revised balance (b) is the rounded value of the balance (R(b)). Similarly, if the given entry in the first row is a sub total (t), the revised error (e') is the sub total (t) plus the rounded value of the sum of the sub total (t) and the current error (e) (rounded up or down, or to a particular digit), and the revised sub total (t) is the rounded value of the sum of the sub total (t) and the current error (e).

Furthermore, if the given entry in the first row is a grand total (g), and (subsequently) there are additional grand totals in the financial statement (S), the revised error (e') is the grand total (g) minus the rounded value of the sum of the grand total (g) and the current error (e) (rounded up or down, or to a particular digit), and the revised grand total (g) is the rounded value of the sum of the grand total (g) and the current error (e). Alternatively, if there are no additional grand totals in the financial statement (S) and there is an equation associated with the financial statement (S), the revised grand total (g) is the sum of the grand total (g) and the statement inequality associated with the equation. For example, assets equal liability plus equity, but when a round-off error occurs on both sides of this equation it becomes an 'inequality,' in which case the rounding errors are applied to the assets and one of the values on the right-hand side (i.e., liabilities or equity). Similarly, gross revenue minus cost of goods equals net revenue, net revenue minus expenses equals net income, aggregate gross income minus deductions equals net taxable income, and so on. Typically, each financial statement includes at least one such equation. In the event of a round-off error (i.e., when an equation becomes an inequality), the rounding errors can be applied to both sides of the equation.

After the given entry in the first row has been processed, the column (m) is incremented, and the next entry in the first row is processed. Once the last column in the first row has been processed (i.e., when $L_n(m)$ is empty or 'NULL'), the row (n) is incremented and the preceding operations repeat until the last row in the financial statement has been processed, at which point method 150 ends.

Figure 2:
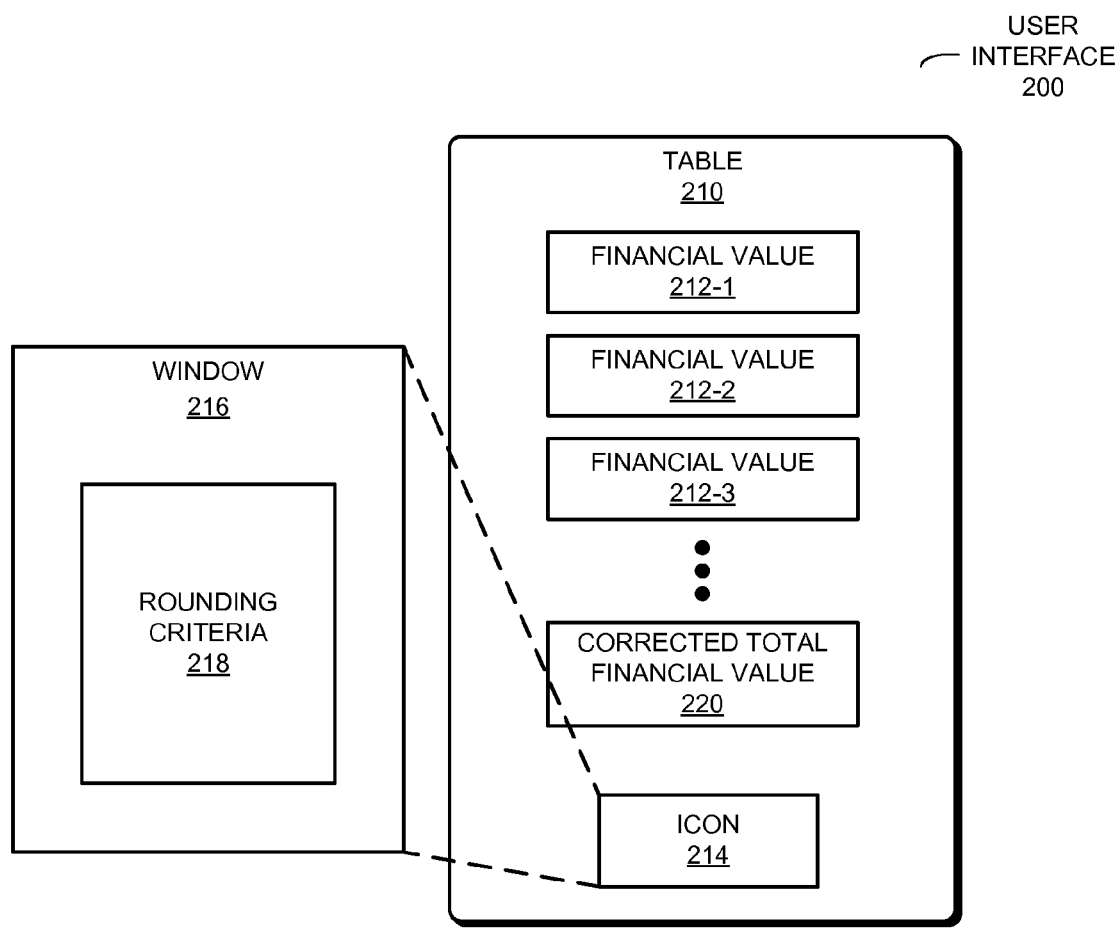
FIG. 2 is a drawing of a user interface in accordance with an embodiment of the present disclosure.

We now describe a user interface that a user may interact with while methods 100 (FIG. 1A) and/or 150 are performed. FIG. 2 presents a drawing of a user interface 200, which may be displayed on a computer or computer system (such as computer system 300 in FIG. 3 or computer system 400 in FIG. 4). In this user interface, a financial calculation may be performed using financial values 212 in table 210. Based on one or more rounding criteria 218, which the user may provide or select in window 216 (which may be displayed when the user activates icon 214), the financial calculation may be corrected for a rounding error, thereby providing corrected total financial value 220. As noted previously, there may be different rounding criteria for different types of currency and/or for different financial calculations.

Figure 3:
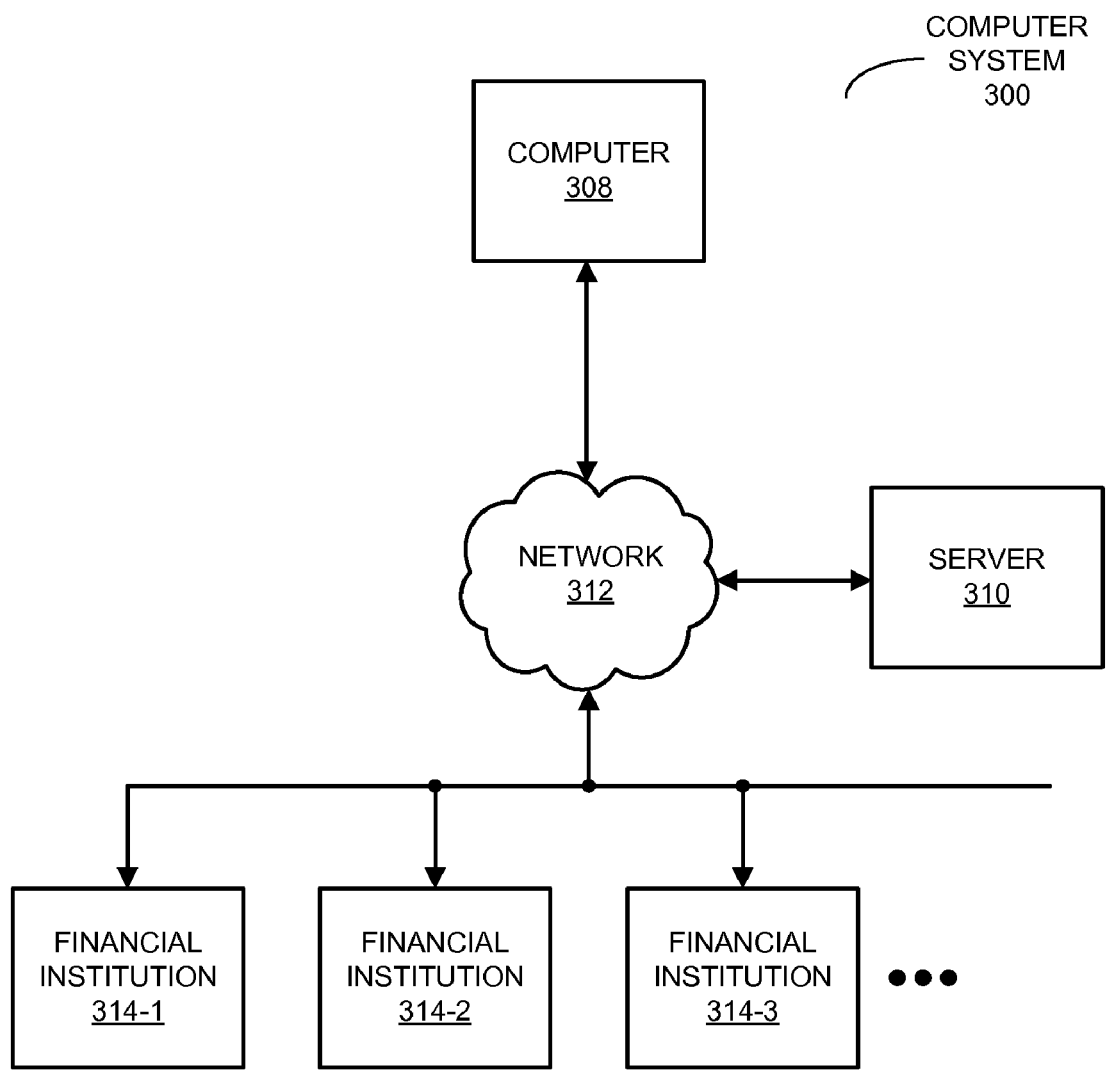
FIG. 3 is a block diagram illustrating a computer system that performs the methods of FIGS. 1A and 1B in accordance with an embodiment of the present disclosure.

We now describe embodiments of the computer system and its use. FIG. 3 presents a block diagram illustrating a computer system 300 that performs methods 100 (FIG. 1A) and/or 150 (FIG. 1B). In this system, a user of computer 308 may use financial software to perform a financial calculation. For example, via network 312, the user may access a web page that is provided by server 310 using a web browser that is installed and which executes on computer 308. Alternatively or additionally, the user may use a financial-software application that is resident on and that executes on computer 308. This application may be a stand-alone application or a portion of another application that is resident on and which executes on computer 308.

In some embodiments, at least a portion of the financial-software application may be a software application tool (such as a financial-software application tool) that is embedded in the web page (and which executes in a virtual environment of the web browser). In an illustrative embodiment, the financial-software application tool is a software package written in: JavaScript™ (a trademark of Sun Microsystems, Inc.), e.g., the financial-software application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded financial-software application tool may include programs or procedures containing. JavaScript, ECMAScript instructions, VBScript instructions, or instructions in another programming language suitable for rendering by the web browser or another client application (such as on computer 308). Thus, the financial-software application may be provided to the user via a client-server architecture.

During the financial calculation, the financial-software application may execute the operations in methods 100 (FIG. 1A) and/or 150 (FIG. 1B), thereby correcting for a rounding error. As described further below with reference to FIG. 4, procedures and/or modules associated with methods 100 (FIG. 1A) and/or 150 (FIG. 1B) may be stored on and may execute in the environment of server 310 and/or computer 308. Additionally, during the financial calculation, the financial-software application may access financial records associated with the user, such as: bank records, credit card records, income-tax returns, financial statements, etc. These financial records may be maintained by financial institutions 314 (such as banks, brokerages, credit-card companies, etc.), and may be accessed by the financial-software application using network 312.

Note that the information in computer system 300 (such as the financial records) may be stored at one or more locations in computer system 300 (i.e., locally or remotely). Moreover, because this information may be sensitive in nature, it may be encrypted. For example, stored information and/or information communicated via network 312 may be encrypted.

Figure 4:
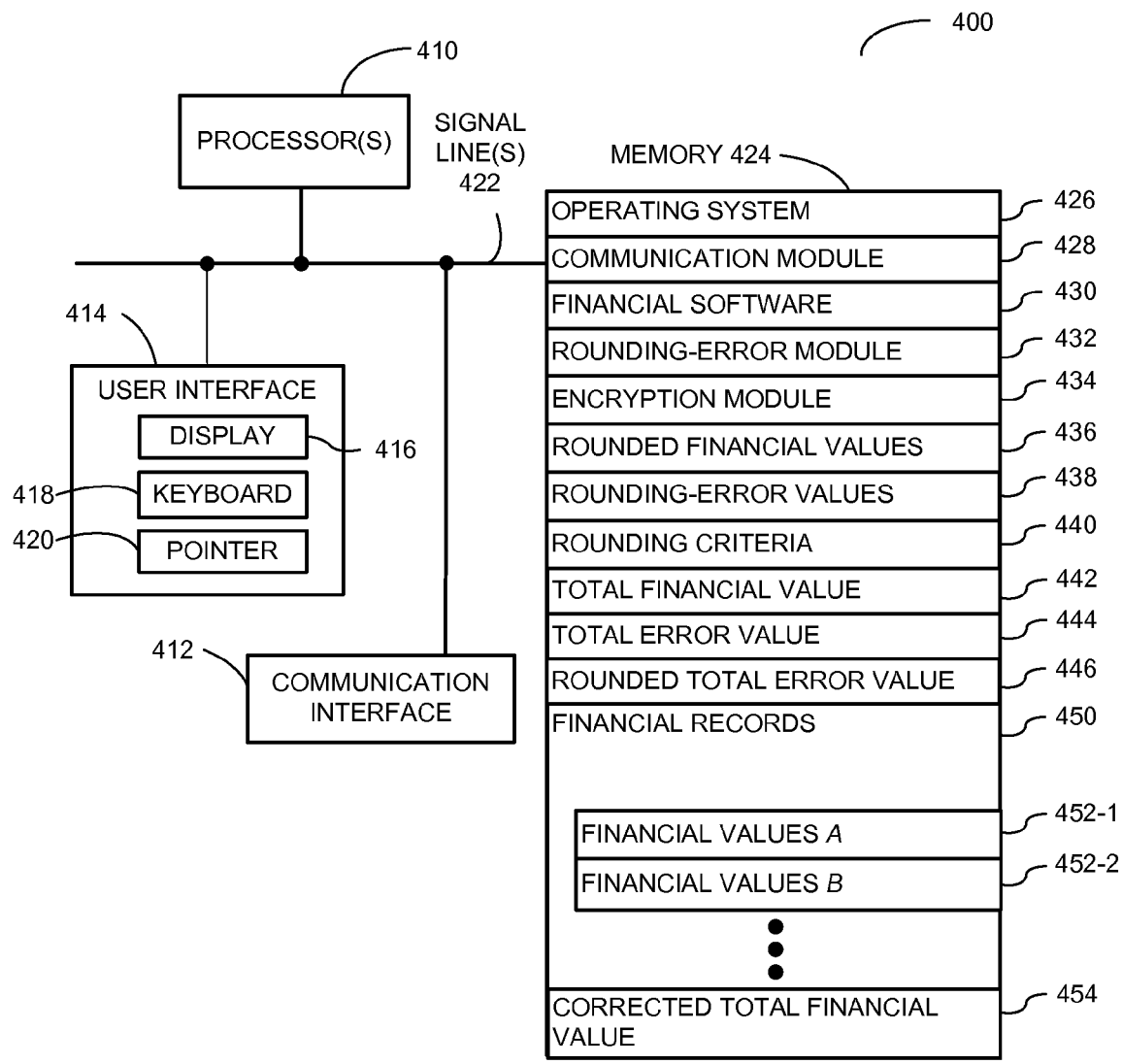
FIG. 4 is a block diagram illustrating a computer system that performs the methods of FIGS. 1A and 1B in accordance with an embodiment of the present disclosure.

FIG. 4 presents a block diagram illustrating a computer system 400 that performs methods 100 (FIG. 1A) and/or 150 (FIG. 1B), such as server 310 (FIG. 3). Computer system 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to the computer system 400. While not shown in FIG. 4, in some embodiments memory 424 includes a web browser.

Memory 424 may also include multiple program modules (or sets of instructions), including: financial software 430 (or a set of instructions), rounding-error module 432 (or a set of instructions), and/or encryption module 434. Note that one or more of these program modules (or sets of instructions) may constitute a computer-program mechanism.

During operation, financial software 430 may perform one or more financial calculations using financial values associated with financial records 450 of a user, such as financial values A 452-1 and financial values B 452-2. Using rounding-error module 432, rounded financial values 436 and rounding-error values 438 are determined based on one or more rounding criteria 440 from financial values 452. Then, a total financial value 442 is computed based on rounded financial values 436. Furthermore, a total error value 444 is determined by summing rounding-error values 438, which is then rounded based on one or more of rounding criteria 440 to determine rounded total error value 446. This rounded total error value is used to correct one or more rounding errors in total financial value 442 to compute a corrected total financial value 454.

In some embodiments, at least some of the information stored in memory 424 and/or at least some of the information communicated using communication module 428 is encrypted using encryption module 434. Furthermore, in some embodiments one or more of the modules in memory 424 may be included in financial software 430.

Instructions in the various modules in the memory 424 may be implemented in: a high-level procedural language, an object-oriented programming language, and/or in an assembly or machine language. Note that the programming language may be compiled or interpreted, e.g., configurable or configured, to be executed by the one or more processing units 410.

Although the computer system 400 is illustrated as having a number of discrete items, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more application-specific integrated circuits (ASICs) and/or one or more digital signal processors (DSPs).

Computers and servers in computer systems 300 (FIG. 3) and/or 400 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 312 (FIG. 3) may include: the Internet, World Wide Web (WWW), an intranet, LAN, WAN, MAN, or a combination of networks, or other technology enabling communication between computing systems.

In exemplary embodiments, the financial-software application (i.e., financial software 430) includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

User interface 200 (FIG. 2), computer systems 300 (FIG. 3) and/or 400 may include fewer components or additional components. Moreover, two or more components may be combined into a single component, and/or a position of one or more components may be changed. In some embodiments, the functionality of the computer systems 300 (FIG. 3) and/or 400 may be implemented more in hardware and less in software, or less in hardware and more in software, as is known in the art.

Figure 5:
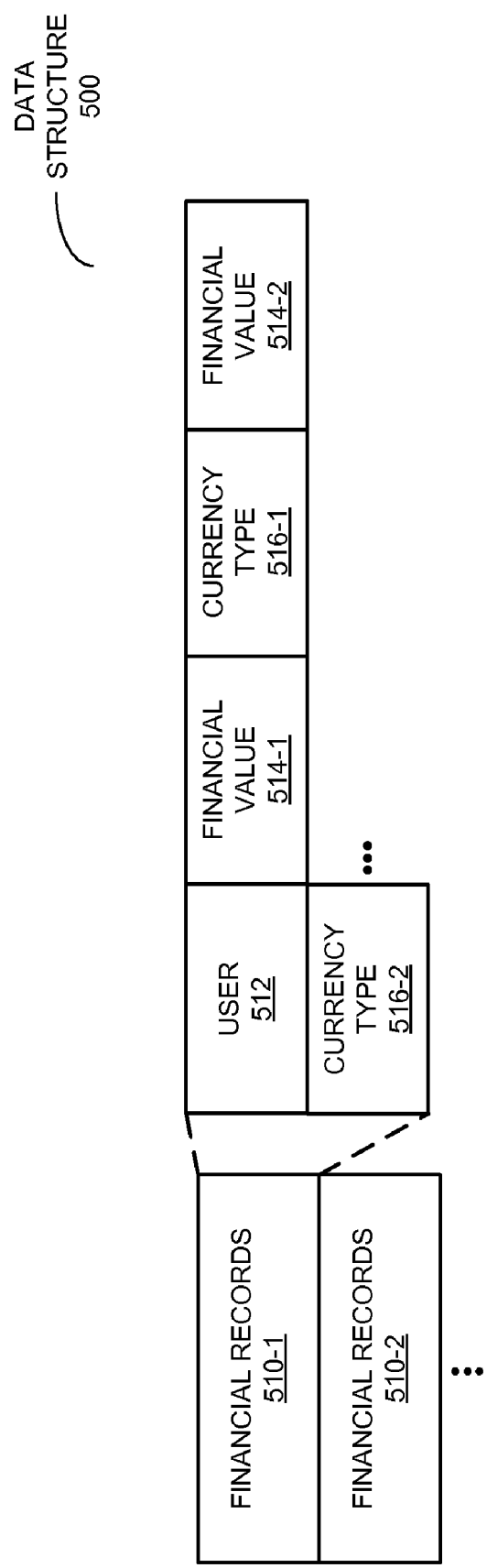
FIG. 5 is a block diagram illustrating a data structure for use in the computer system of FIG. 4 in accordance with an embodiment of the present disclosure.

We now discuss a data structure. FIG. 5 presents a block diagram illustrating a data structure 500 for use in computer system 400 (FIG. 4). This data structure may include financial records 510. For example, financial records 510-1 may include: a user 512 (such as an individual, an organization or a company), financial values 514, and/or associated currency types 516.

In some embodiments of data structure 500 there may be fewer or additional components. Moreover, two or more components may be combined into a single component and/or a position of one or more components may be changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method for performing a financial calculation, comprising:
    at one or more computers, performing operations for:
        computing rounded financial values and associated rounding error values by rounding initial financial values based on a rounding criterion;
        calculating a total financial value by summing the rounded financial values;

calculating a total error value by summing the rounding error values;

determining a rounded total error value by rounding the total error value based on the rounding criterion; and generating a corrected total financial value by correcting a rounding error in the total financial value using the rounded total error value.

2. The method of claim 1, wherein the method further includes:

receiving the initial financial values from a user; or accessing the initial financial values from a computer-readable medium.

3. The method of claim 1, wherein the financial calculation is performed by a spreadsheet application.

4. The method of claim 1, wherein the financial calculation is performed by financial software.

5. The method of claim 1, wherein the financial calculation is associated with an income-tax return.

6. The method of claim 1, wherein the financial calculation is associated with a financial statement.

7. The method of claim 1, wherein the financial calculation is associated with a brokerage statement.

8. The method of claim 1, wherein the financial calculation is associated with an accounting statement.

9. The method of claim 1, wherein the rounding criterion is associated with a type of currency.

10. The method of claim 1, wherein the rounding error is corrected by subtracting the rounded total error value from the total financial value.

11. The method of claim 1, wherein the method further includes:

segregating the initial financial values into groups of financial values based on types of currency that are associated with the initial financial values, wherein a given group of financial values is associated with a given type of currency;

performing the operations in the method for each group of financial values; and aggregating the corrected total financial values for the groups of financial values.

12. A computer-program product for use in conjunction with a computer system, the computer-program product comprising a non-transitory computer-readable storage medium and a computer-program mechanism embedded therein for performing a financial calculation, the computer-program mechanism including:

instructions for calculating rounded financial values and associated rounding error values by rounding initial financial values based on a rounding criterion;

instructions for calculating a total financial value by summing the rounded financial values;

instructions for calculating a total error value by summing the rounding error values;

instructions for determining a rounded total error value by rounding the total error value based on the rounding criterion; and instructions for generating a corrected total financial value by correcting a rounding error in the total financial value using the rounded total error value.

13. The computer-program product of claim 12, wherein the computer-program mechanism includes:

instructions for receiving the initial financial values from a user; or instructions for accessing the initial financial values in a computer-readable medium.

14. The computer-program product of claim 12, wherein the financial calculation is performed by a spreadsheet application.

15. The computer-program product of claim 12, wherein the financial calculation is performed by financial software.

16. The computer-program product of claim 12, wherein the financial calculation is associated with an income-tax return.

17. The computer-program product of claim 12, wherein the financial calculation is associated with a financial statement.

18. The computer-program product of claim 12, wherein the financial calculation is associated with a brokerage statement.

19. The computer-program product of claim 12, wherein the financial calculation is associated with an accounting statement.

20. The computer-program product of claim 12, wherein the rounding criterion is associated with a type of currency.

21. The computer-program product of claim 12, wherein the computer-program mechanism includes:

instructions for segregating the initial financial values into groups of financial values based on types of currency that are associated with the initial financial values, wherein a given group of financial values is associated with a given type of currency;

instructions for performing the operations in the method for each group of financial values; and instructions for aggregating the corrected total financial values for the groups of financial values.

22. A computer system, comprising:

a processor;

memory; and a program module, wherein the program module is stored in the memory and configurable to be executed by the processor, the program module including:

instructions for calculating rounded financial values and associated rounding error values by rounding initial financial values based on a rounding criterion;

instructions for calculating a total financial value by summing the rounded financial values;

instructions for calculating a total error value by summing the rounding error values;

instructions for determining a rounded total error value by rounding the total error value based on the rounding criterion; and instructions for generating a corrected total financial value by correcting a rounding error in the total financial value using the rounded total error value.

* * * * *